United States Patent
Tsujimoto

(10) Patent No.: US 7,591,593 B2
(45) Date of Patent: Sep. 22, 2009

(54) SEALED ROLLING BEARING

(75) Inventor: Takashi Tsujimoto, Iwata (JP)

(73) Assignee: NTN Corporation, Osaka (JP)

( * ) Notice: Subject to any disclaimer, the term of this patent is extended or adjusted under 35 U.S.C. 154(b) by 358 days.

(21) Appl. No.: 11/330,247

(22) Filed: Jan. 12, 2006

(65) Prior Publication Data

US 2006/0177167 A1 Aug. 10, 2006

(30) Foreign Application Priority Data

| Feb. 4, 2005 | (JP) | ............................ 2005-029116 |
| Feb. 4, 2005 | (JP) | ............................ 2005-029144 |
| Feb. 4, 2005 | (JP) | ............................ 2005-029269 |
| Feb. 7, 2005 | (JP) | ............................ 2005-030125 |
| Feb. 7, 2005 | (JP) | ............................ 2005-030143 |
| Feb. 25, 2005 | (JP) | ............................ 2005-050273 |

(51) Int. Cl.
F16C 33/76 (2006.01)

(52) U.S. Cl. .................................................... 384/486

(58) Field of Classification Search ......... 384/484–486, 384/477, 470, 513, 516, 531, 532
See application file for complete search history.

(56) References Cited

U.S. PATENT DOCUMENTS

| 3,994,545 A * | 11/1976 | Van Dorn ..................... 384/482 |
| 4,516,783 A * | 5/1985 | Mitsue et al. ................ 384/482 |
| 4,792,243 A * | 12/1988 | Takeuchi et al. ............ 384/486 |
| 5,022,659 A * | 6/1991 | Otto ............................ 384/486 |
| 5,042,822 A * | 8/1991 | Dreschmann et al. ....... 384/486 |
| 5,147,139 A * | 9/1992 | Lederman ................... 384/486 |
| 5,419,642 A * | 5/1995 | McLarty ..................... 384/486 |
| 6,042,272 A * | 3/2000 | Nagase ....................... 384/486 |
| 6,082,905 A * | 7/2000 | Vignotto et al. ............. 384/484 |
| 6,471,211 B1 * | 10/2002 | Garnett et al. .............. 384/486 |
| 6,811,316 B2 * | 11/2004 | Yamashita et al. .......... 384/482 |
| 6,854,893 B2 * | 2/2005 | Schmidt ...................... 384/486 |
| 7,201,685 B2 * | 4/2007 | Terada et al. ................ 384/486 |
| 7,258,491 B2 * | 8/2007 | Gutowski et al. ........... 384/486 |
| 2004/0208408 A1 * | 10/2004 | Kobayashi et al. .......... 384/484 |

(Continued)

FOREIGN PATENT DOCUMENTS

JP 3-100622 10/1991

(Continued)

OTHER PUBLICATIONS

Japanese Office Action ("Notice of Reasons for Rejection") issued Jul. 28, 2009 in connection with counterpart JP Application No. 2005-050273 (with partial English translation).

*Primary Examiner*—Thomas R Hannon
(74) *Attorney, Agent, or Firm*—Wenderoth, Lind & Ponack, L.L.P.

(57) ABSTRACT

A sealed rolling bearing includes an inner ring and an outer ring defining a bearing space therebetween. Axially inner and outer contact seals are provided on each side of the bearing space to seal the bearing space. The axially outer contact seals stop any splashed muddy water, thereby keeping the lips of the axially inner contact seals and their sliding contact surfaces free of muddy water. This prevents the lips of the axially inner contact seals and their sliding contact surfaces from becoming worn by muddy water. The axially inner contact seals thus maintain high sealability even if the bearing is used in environments where muddy water splashes.

12 Claims, 7 Drawing Sheets

U.S. PATENT DOCUMENTS

2004/0228558 A1 * 11/2004 Cha et al. .................. 384/486

FOREIGN PATENT DOCUMENTS

| JP | 7-10555 | 2/1995 |
| JP | 8-3710 | 1/1996 |
| JP | 2001-050288 | 2/2001 |
| JP | 2004-036825 | 2/2004 |
| JP | 2005-016684 | 1/2005 |

* cited by examiner

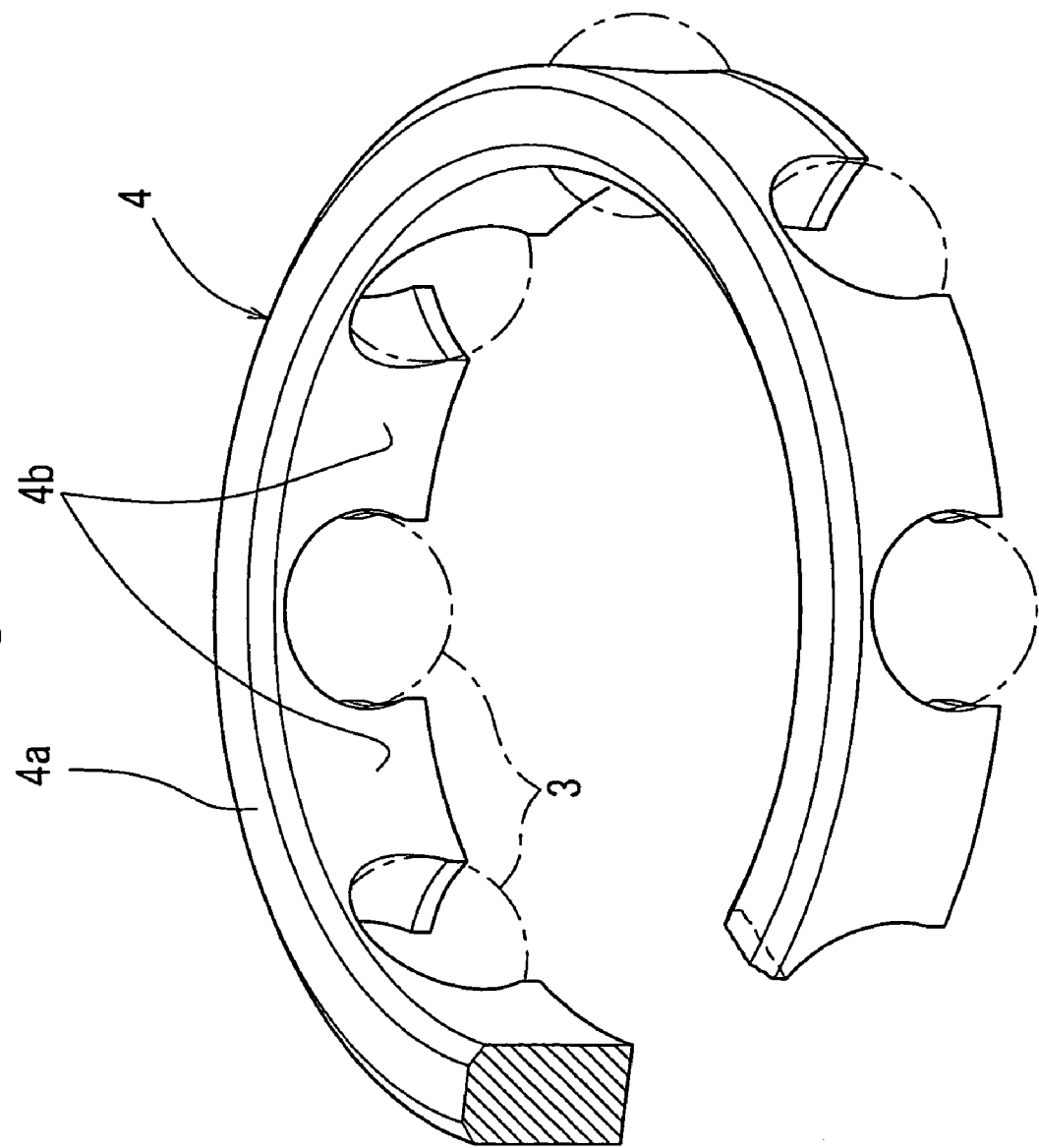

SEALED ROLLING BEARING

BACKGROUND OF THE INVENTION

The present invention relates to a sealed rolling bearing having a bearing space between inner and outer rings and which is sealed with contact seals.

As rolling bearings used in environments where dust flies and water splashes, sealed rolling bearings are typically used. The sealed rolling bearings have their bearing space sealed with contact seals to prevent entry of dust and water into the bearing space. The contact seals include lips that are in sliding contact with the inner or outer ring to seal the bearing space.

Some of such sealed rolling bearings include two such contact seals each provided on one side of the bearing space (as disclosed in JP utility model publication 7-10555A (FIG. 1); Reference 1). Other sealed rolling bearings include, besides such two contact seals, non-contact shields each provided outside of one of the two contact seals (as disclosed in JP utility model publication 8-3710A (FIGS. 1 and 2); Reference 2, and JP patent publication 2001-50288A (FIGS. 1 and 3 to 10); Reference 3). Each shield of the bearing disclosed in Reference 2 comprises two separate members, one mounted on the outer ring and the other mounted on the inner ring. A labyrinth space is formed between the two separate members. The bearing disclosed in Reference 3 has a labyrinth space formed between each shield (cover) and the inner contact seal. References 2 and 3 also disclose embodiments in which the contact seals include lips that are in contact with the respective shields.

Rolling bearings used to support center shafts of vehicle propeller shafts and joint shafts of drive shafts are provided under vehicle floors. Thus, such rolling bearings tend to be splashed with muddy water and hit by flying stones.

For such a rolling bearing, if the rolling bearing disclosed in Reference 1 were to be used, splashed muddy water would adhere to the lips of the contact seals or the sliding contact surfaces of the inner or outer ring, causing the lips and/or the sliding contact surfaces to become worn by mud contained in such muddy water. This extremely lowers the sealability of the bearing space.

In the sealed rolling bearings disclosed in References 2 and 3, the shields prevent muddy water from adhering directly to the lips of the contact seals and the sliding contact surfaces. However, since there exists a gap between each shield and the inner or outer ring, muddy water tends to infiltrate through the labyrinth gaps into gaps between the shields and the contact seals. The water content of muddy water in the gaps between the shields and the contact seals will evaporate, so that the concentration of mud in the muddy water will increase. When such muddy water, of which the concentration of mud has increased, adheres to the lips of the contact seals and the sliding contact surfaces, these portions will become worn. This lowers sealability of the bearing space.

An object of the present invention is to provide a sealed rolling bearing which can keep high sealability even if used in environments where muddy water splashes.

SUMMARY OF THE INVENTION

According to the present invention, there is provided a sealed rolling bearing comprising an inner ring and an outer ring defining a bearing space therebetween, rolling elements disposed in the bearing space, first and second contact seals disposed between the inner and outer rings on opposing axial sides of the bearing space, and third and fourth contact seals disposed between the inner and outer rings on opposing axial sides of the bearing space, the third and fourth contact seals being provided axially inwardly of the first and second contact seals, respectively, each of the first to fourth contact seals being mounted on one of the inner and outer rings and including a lip made of an elastic material and kept in sliding contact with a sliding contact surface formed on the other of the inner and outer rings.

The axially outer first and second contact seals stop splashed muddy water from reaching and adhering to the lips of the axially inner third and fourth contact seals, and their sliding contact surfaces, thereby preventing wear of the lips of the inner third and fourth contact seals and their sliding contact surfaces. The contact seals can thus maintain high sealability even in environments where muddy water splashes.

Preferably, the lips of the first and second contact seals are in sliding contact with the respective sliding contact surfaces with an interference of not less than 0.4 mm. With this arrangement, even after the lips of the first and second seals and/or their sliding contact surfaces become worn, the first and second contact seals can reliably stop muddy water.

The interference of the lips of the first and second contact seals were determined to be not less than 0.4 mm based on the amounts of wear of the lips of the contact seals and their sliding contact surfaces, as measured after an endurance test of the sealed rolling bearing conducted in environments where muddy water splashes. The amounts of wear of the lips and their sliding contact surfaces were not more than 0.3 mm and not more than 0.1 mm, respectively, after the test had been carried out for a period of time equivalent to the life of a motor vehicle.

The lips of the first and second contact seals are preferably made of nitrile rubber or fluororubber, which are known to have superior wear resistance.

In order to completely stop infiltration of muddy water through the first and second contact seals, the lips of the first and second contact seals are preferably in surface contact with the respective sliding contact surfaces.

In order to further completely stop infiltration of muddy water through the first and second contact seals, each of the first and second contact seals preferably includes two axially inner and outer lips made of an elastic material and in sliding contact with the sliding contact surface.

Preferably, the axially outer lip is in surface contact with the sliding contact surface, and the axially inner lip is in line contact with the sliding contact surface. With this arrangement, the axially outer lip almost completely stops passage of muddy water therethrough by coming into surface contact with the sliding contact surface, while the axially inner lip completely stops passage of any muddy water that has infiltrated through the axially outer lip by coming into line contact with the sliding contact surface.

In order to further completely prevent entry of any muddy water into the bearing space, the lips of the third and fourth contact seals are preferably in line contact with the respective sliding contact surfaces.

In order to prevent damage to or shifting of the first and second contact seals even if hit by e.g. small stones, to thereby prevent deterioration in sealability of the first and second contact seals, each of the first and second contact seals preferably includes a metallic core that is fitted in the one of the inner and outer rings, thereby fixing the first and second contact seals to the one of the inner and outer rings.

Preferably, each of the first and second contact seals further includes an additional lip disposed axially outwardly of a portion of the metallic core that is fitted in the one of the inner and outer rings, and in contact with the one of the inner and outer rings, thereby sealing this portion of the metallic core.

This ensures sealability of this portion of the metallic core, which in turn prevents rusting of the metallic core due to contact with water that may infiltrate into the above portion of the metallic core.

Grease is preferably sealed in a space defined by the first and third contact seals and the inner and outer rings and in a space defined by the second and fourth contact seals and the inner and outer rings. With this arrangement, a sufficient amount of grease can be supplied to lips of the first and second contact seals and their sliding contact surfaces, to which the lubricant sealed in the bearing space can be scarcely supplied. This significantly reduces the frictional resistance between the lips of the first and second contact seals and their sliding contact surfaces $2a$, thereby stabilizing the bearing torque at a low level. Grease sealed in the above spaces also serves as a grease seal for stopping any water that may infiltrate between the first and second contact seals and their sliding contact surfaces and also reduces the wear therebetween.

The lips of the first and second contact seals are preferably brought into sliding contact with the radially inner surface of the outer ring. With this arrangement, a sufficient amount of grease can be supplied to the lips of the first and second contact seals and their sliding contact surfaces because a large portion of the grease sealed in the above spaces moves toward the radially inner surface of the outer ring under centrifugal force while the bearing is rotating.

Preferably, the bearing of the present invention further comprises a retainer retaining the rolling elements, the rolling elements being disposed between raceways formed in the inner and outer rings, respectively, the raceways having their axial centers axially offset toward one axial end of the bearing from an axial center of the bearing, the retainer including an annular portion disposed on one axial side of the rolling elements remote from the one axial end of the bearing, and having no annular portion on the other axial side of the rolling elements. With this arrangement, it is possible to reduce the axial length of the bearing.

If the rolling elements are balls, the retainer preferably further comprises pillars extending axially from the annular portion toward the one axial end of the bearing, while being circumferentially spaced apart from each other so that the retainer has the shape of a crown, the balls being each held between a circumferentially adjacent pair of the pillars.

BRIEF DESCRIPTION OF THE DRAWINGS

Other features and objects of the present invention will become apparent from the following description made with reference to the accompanying drawings, in which:

FIG. 7 is a partially cutaway perspective view of a retainer shown in FIG. 6.

DETAILED DESCRIPTION OF THE PREFERRED EMBODIMENTS

Figure 1:
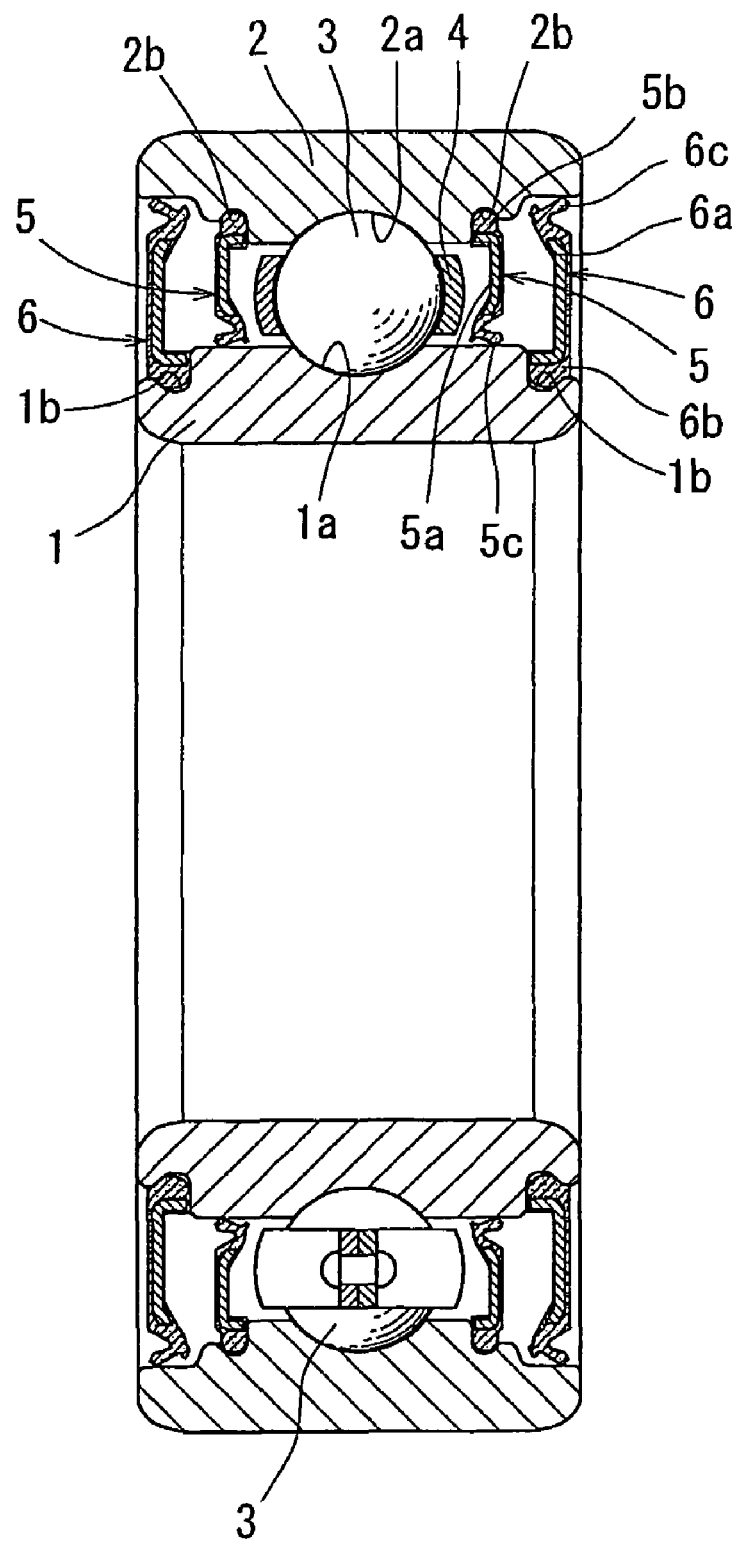
FIG. 1 is a vertical sectional view of a sealed rolling bearing according to a first embodiment of the present invention.
Figure 2:
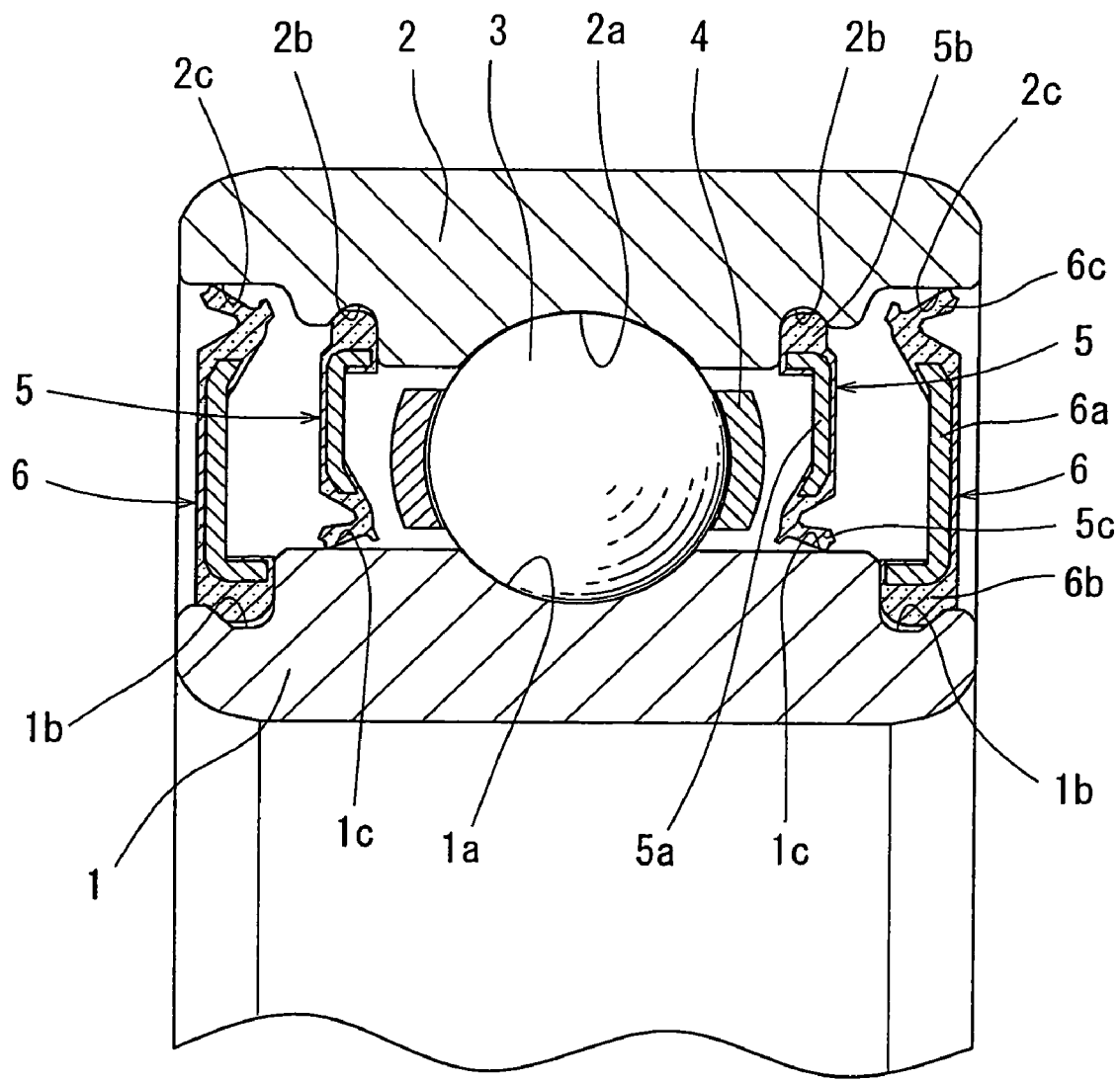
FIG. 2 is a partial enlarged sectional view of FIG. 1.

Now referring to the drawings, FIGS. 1 and 2 show the sealed rolling bearing according to the first embodiment of the present invention, which comprises, as shown in FIG. 1, an inner ring 1 and an outer ring 2 formed with raceways $1a$ and $2a$, respectively, rolling elements in the form of balls 3 disposed between the raceways $1a$ and $2a$, and a retainer 4 retaining the balls 3. The inner and outer rings 1 and 2 define a bearing space therebetween in which are disposed the balls 3 and the retainer 4. An axially inner contact seal 5 and an axially outer contact seal 6 are provided on either side of the bearing space, thereby sealing the bearing space.

As shown in FIG. 2, each of the contact seals 5 and 6 comprises metallic core $5a$, $6a$ having an L-shaped section, and an elastic member $5b$, $6b$. Each of the inner contact seals 5 is fixed to the outer ring 2 by having its elastic member $5b$ partially fitted in a groove $2b$ formed in the radially inner surface of the outer ring 2 with its lip $5c$ in sliding contact with a sliding contact surface $1c$ of the inner ring 1. Each of the outer contact seals 6 is fixed to the inner ring 1 by having its elastic member $6b$ partially fitted in a groove $1b$ formed in the radially outer surface of the inner ring 1 with its lip $6c$ in sliding contact with a sliding contact surface $2c$ of the outer ring 2.

The elastic members $6b$ of the outer contact seals 6 are made of nitrile rubber or fluororubber. The lips $6c$ are pressed against the sliding contact surfaces $2c$ with an interference of not less than 0.4 mm so that no gap will be created between the lips $6c$ and the sliding contact surfaces $2c$ even if the lips $6c$ and/or the sliding contact surfaces $2c$ become worn. With this arrangement, the axially outer contact seals 6 completely prevent entry of muddy water into the space defined by the outer contact seals 6, thereby keeping the inner contact seals 5 free of contact with muddy water.

Figure 3:
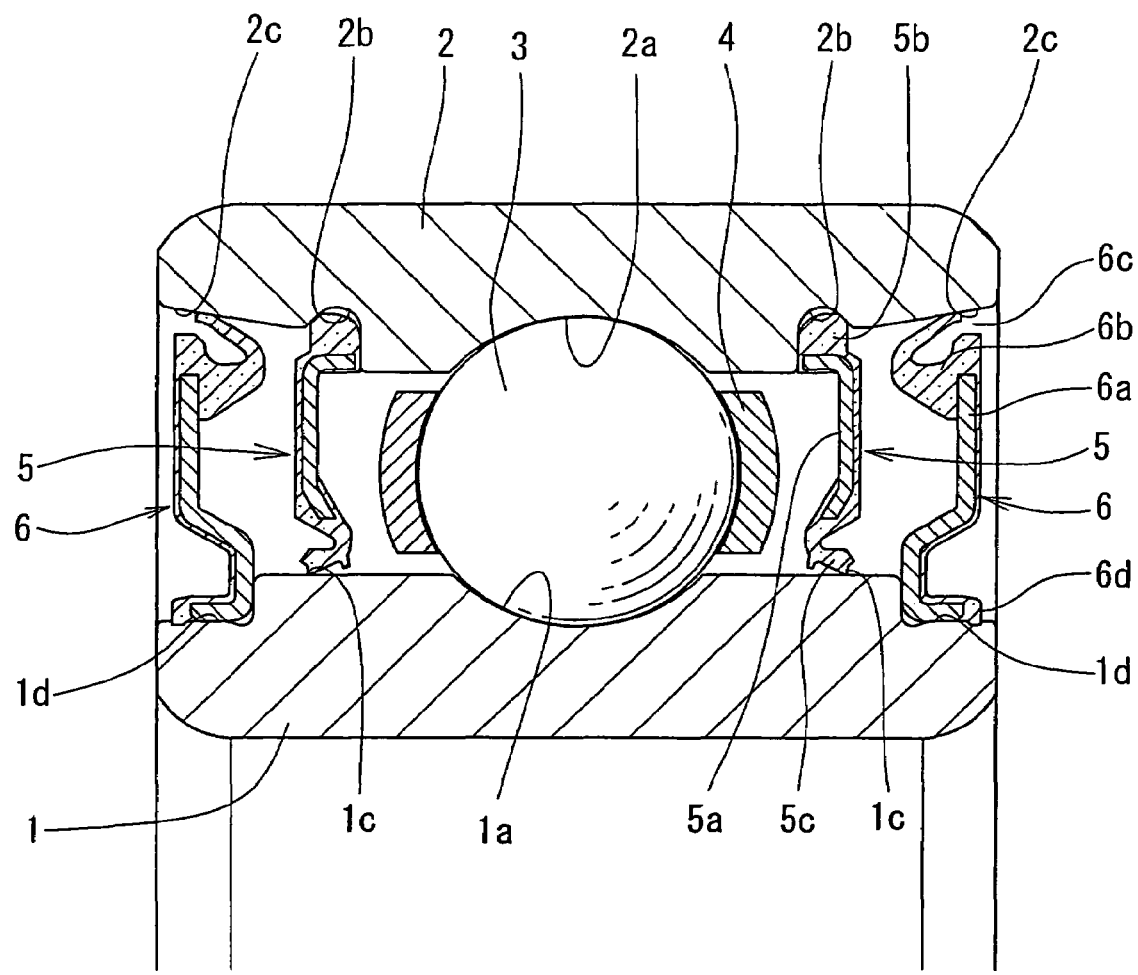
FIGS. 3 to 5 are partial enlarged sectional views of sealed rolling bearing according to second to fourth embodiments of the present invention.

FIG. 3 shows the sealed rolling bearing according to the second embodiment of the invention, which is also a ball bearing similar to the ball bearing of the first embodiment and like the first embodiment, includes an axially outer contact seal 6 and an axially inner contact seal 5 on either side of the bearing space. Each of the axially outer seals 6 comprises a metallic core $6a$ and an elastic member $6b$ and is fixed to the inner ring 1 by having the metallic core $6a$ engaged in a shoulder portion $1d$ formed in the radially outer surface of the inner ring 1. From the portion of the metallic core $6a$ engaged in the shoulder portion $1d$, the metallic core $6a$ extends axially outwardly and then extends radially outwardly. The elastic member $6b$ has a lip $6c$ provided at the radially outer end of the metallic core $6a$. The lip $6c$ has its side in surface contact with the sliding contact surface $2c$ of the outer ring 2. The axially inner seals 5 are identical in structure to the seals 5 of the first embodiment.

In order to prevent entry of muddy water into the bearing space through any gap between the metallic core $6a$ and the shoulder portion $1d$, the axially outer contact seals 6 each include a further lip $6d$ for sealing the axially outer edge of the portion of the seal 6 that is engaged in the shoulder portion $1d$. As in the first embodiment, the elastic member $6b$ of each contact seal 6 is made of nitrile rubber or fluororubber. The lips $6c$ are pressed against the respective sliding contact surfaces with an interference of not less than 0.4 mm.

Figure 4:
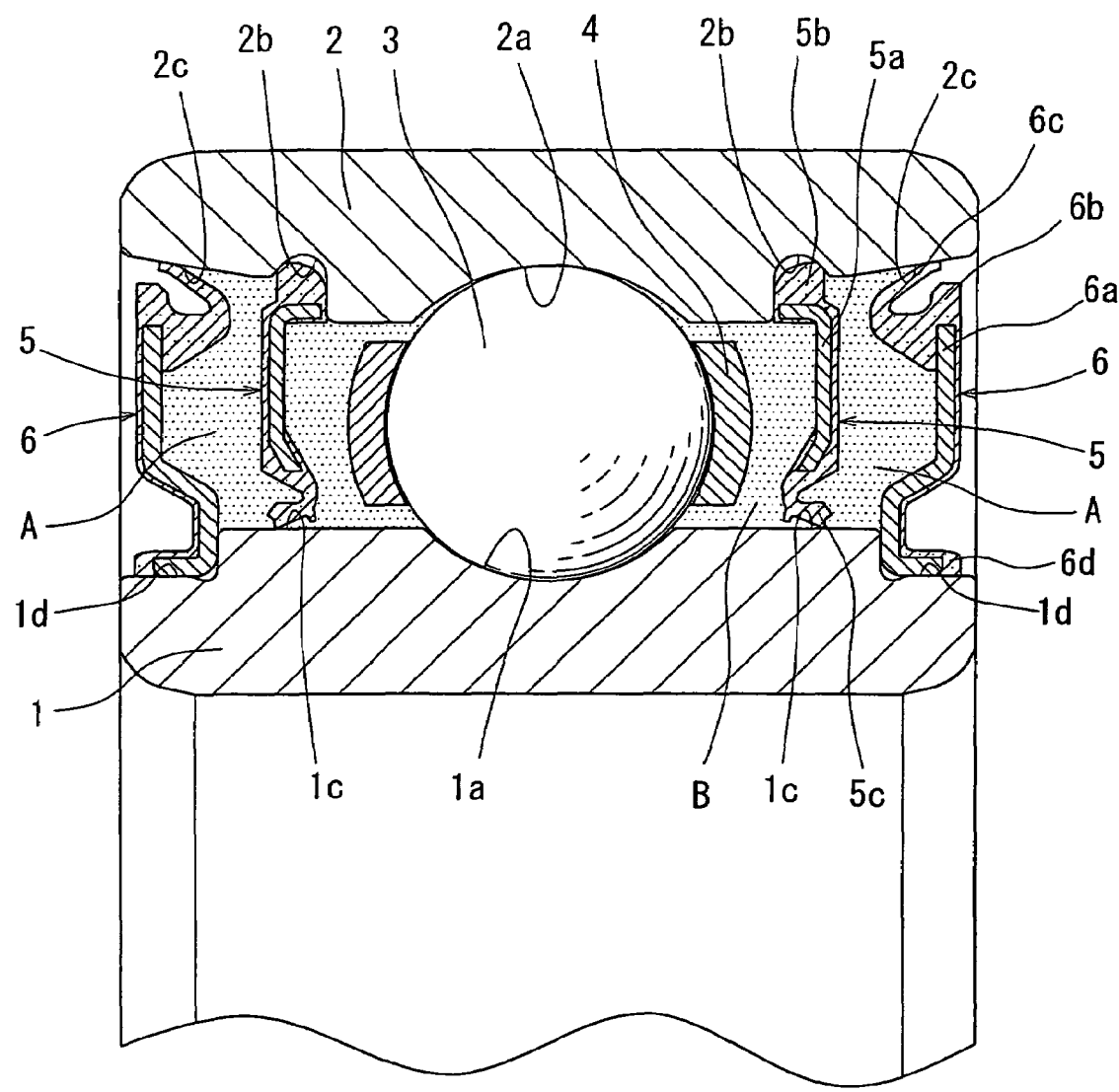

FIG. 4 shows the sealed rolling bearing of the third embodiment, which is basically of the same structure as the second embodiment, and differs therefrom only in that grease A is sealed in a space between the axially inner and outer contact seals 5 and 6. Grease B as a lubricant is sealed in the bearing space, too.

As the bearing rotates, under centrifugal force, a large portion of grease A, i.e. the grease sealed in the space between the contact seals 5 and 6 will move toward the radially inner surface of the outer ring 2. Thus, a sufficient amount of grease A is supplied to the lips $6c$ of the outer contact seals 6 and the sliding contact surfaces $2c$ on the inner periphery of the outer ring 2, to which grease B in the bearing space can be scarcely supplied. This significantly reduces the frictional resistance between the lips $6c$ and the sliding contact surfaces $2c$, thereby stabilizing the bearing torque at a low level. Grease A sealed in the space between the contact seals 5 and 6 also serves as a grease seal for stopping any water that may infiltrate between the outer contact seals 6 and the sliding contact surfaces $2c$.

Figure 5:
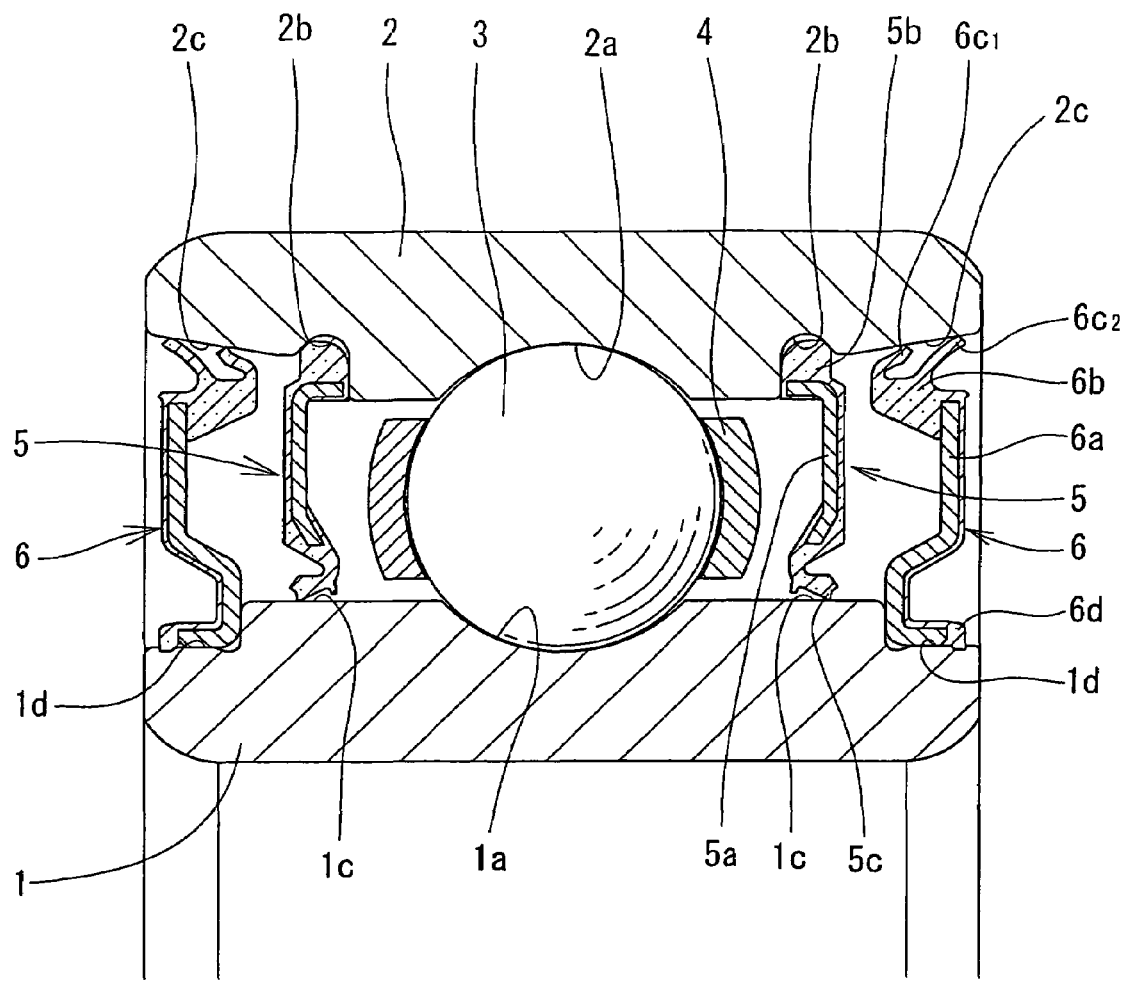

FIG. 5 shows the sealed rolling bearing of the fourth embodiment, which is also basically of the same structure as the second embodiment, and differs therefrom only in that the elastic member $6b$ of each axially outer contact seal 6 has two axially inner and outer lips $6c_1$ and $6c_2$ at its radially outer ends. The axially inner lip $6c_1$ is in line contact with the sliding contact surface $2c$ on the outer ring 2 along its edge. The lip $6c_2$ has its side surface in surface contact with the sliding contact surface $2c$. The outer lip $6c_2$ almost completely blocks any muddy water in the outer environment, while the inner lip $6c_1$ completely stops any water content that may infiltrate through the lip $6c_2$.

Figure 6:
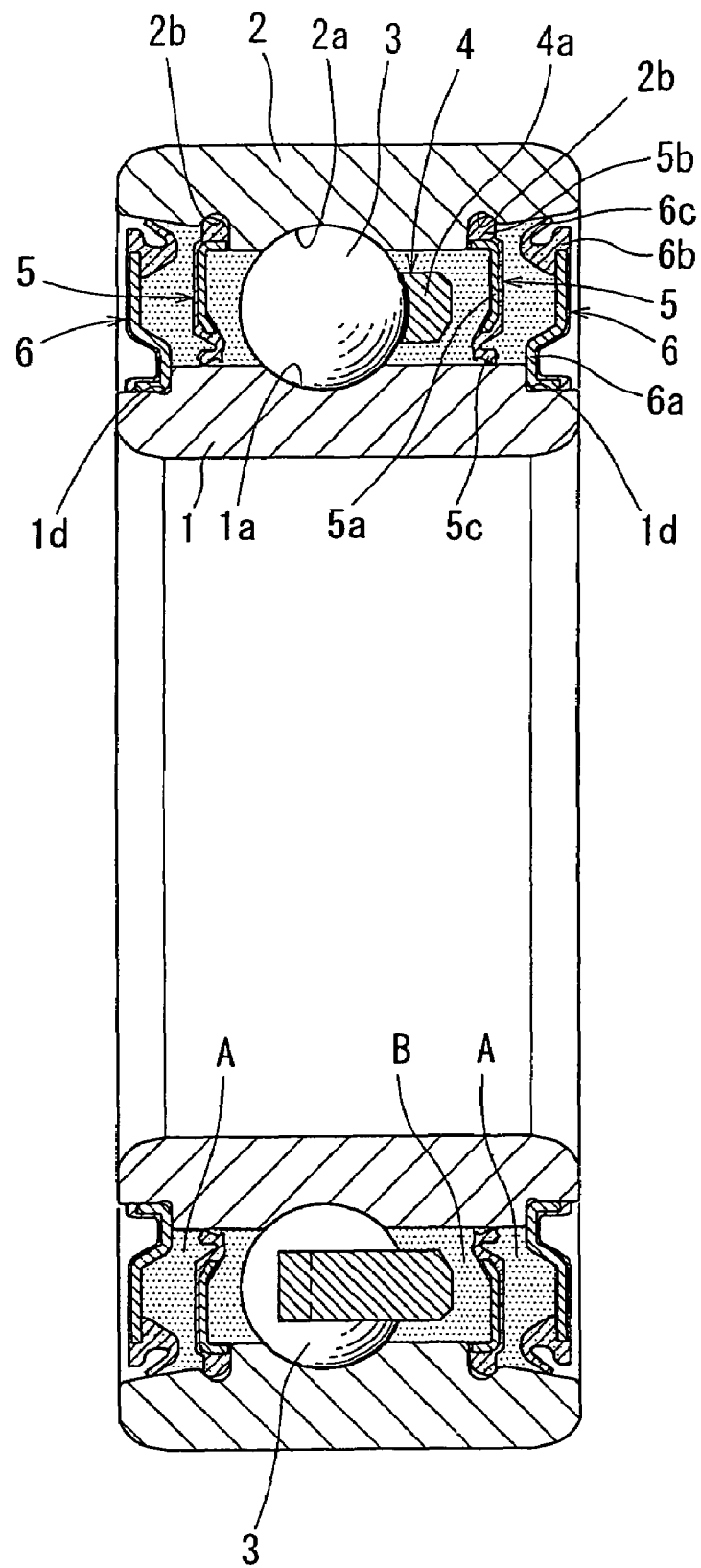
FIG. 6 is a vertical sectional view of a sealed rolling bearing according to a fifth embodiment of the present invention.

FIGS. 6 and 7 show the sealed rolling bearing of the fifth embodiment, which is, as shown in FIG. 6, also a ball bearing comprising an inner ring 1, an outer ring 2, and balls 3 as rolling elements disposed between the inner and outer rings 1 and 2 while being retained by a retainer 4. As with the third embodiment, grease A is sealed in the space between the axially inner and outer contact seals 5 and grease B as a lubricant is sealed in the bearing space.

In this embodiment, the raceways $1a$ and $2a$ of the inner and outer rings 1 and 2 are axially offset toward one axial end of the bearing from the axial center of the bearing. As shown in FIG. 7, the retainer 4 comprises an annular portion $4a$ located on one axial side of the balls 3 remote from the above one axial end of the bearing, and pillars $4b$ axially extending from the annular portion $4a$ toward the above one axial end of the bearing so as to be circumferentially spaced apart from each other. The balls 3 are each received in a space defined between adjacent pillars $4b$. The retainer 4 thus has the shape of a crown. With this arrangement, it is possible to provide the two axially inner and outer contact seals 5 and 6 on either side of the bearing space without unduly increasing the axial dimension of the bearing. The crown-shaped retainer 4 is made of an engineering plastic such as polyamide resin, polyphenylene sulfide resin and polyetheretherketone. If necessary, reinforcing materials such glass fiber or carbon fiber is added to the material of the retainer.

While the sealed bearings of the embodiments are ball bearings, the concept of the invention is applicable to rolling bearings of different types, too. Axially inner and outer contact seals are also not limited to those shown.

What is claimed is:

1. A sealed rolling bearing comprising:
an inner ring and an outer ring defining a bearing space therebetween, said bearing space having first and second axial sides;
rolling elements disposed in said bearing space;
first and second contact seals disposed between said inner and outer rings on the first and second axial sides, respectively, and third and fourth contact seals disposed between said inner and outer rings on the first and second axial sides, respectively, said third and fourth contact seals being provided axially inwardly of said first and second contact seals, respectively, each of said first to fourth contact seals being mounted on one of said inner and outer rings and including a lip made of an elastic material and kept in sliding contact with a sliding contact surface formed on the other of said inner and outer rings;
wherein said inner ring has a radially inner surface that faces radially inwardly and a radially outer surface that faces radially outwardly into said bearing space;
wherein said radially outer surface of said inner ring has, on the first axial side, a first large diameter surface portion and a first small diameter surface portion smaller in diameter than said first large diameter surface portion so as to form a first shoulder portion therebetween;
wherein said radially outer surface of said inner ring has, on the second axial side, a second large diameter surface portion and a second small diameter surface portion smaller in diameter than said second large diameter surface portion so as to form a second shoulder portion therebetween;
wherein said first contact seal includes a first metallic core fitted in said first shoulder portion so as to directly contact said inner ring, thereby fixing said first contact seal to said inner ring;
wherein said second contact seal includes a second metallic core fitted in said second shoulder portion so as to directly contact said inner ring, thereby fixing said second contact seal to said inner ring;
wherein said first metallic core comprises a first annular portion having a first axially outer end and a first axially inner end located axially inwardly of said first axially outer end and fitted on said first small diameter surface portion, and a first upright portion extending radially outwardly along said first shoulder portion from said first axially inner end of said first annular portion, said first upright portion being in direct contact with said first shoulder portion; and
wherein said second metallic core comprises a second annular portion having a second axially outer end and a second axially inner end located axially inwardly of said second axially outer end and fitted on said second small diameter surface portion, and a second upright portion extending radially outwardly along said second shoulder portion from said second axially inner end of said second annular portion, said second upright portion being in direct contact with said second shoulder portion.

2. The sealed rolling bearing of claim 1 wherein said lips of said first and second contact seals are in sliding contact with the respective sliding contact surfaces with an interference of not less than 0.4 mm.

3. The sealed rolling bearing of claim 1 wherein said lips of said first and second contact seals are made of nitrile rubber or fluororubber.

4. The sealed rolling bearing of claim 1 wherein said lips of said first and second contact seals are in surface contact with the respective sliding contact surfaces.

5. The sealed rolling bearing of claim 1 wherein each of said first and second contact seals includes an axially inner lip and an axially outer lip made of an elastic material and in sliding contact with the sliding contact surface.

6. The sealed rolling bearing of claim 5 wherein said axially outer lip is in surface contact with the sliding contact surface, and said axially inner lip is in line contact with the sliding contact surface.

7. The sealed rolling bearing of claim 1 wherein said lips of said third and fourth contact seals are in line contact with the respective sliding contact surfaces.

8. The sealed rolling bearing of claim 1 wherein
said first contact seal further includes an additional lip disposed in contact with said inner ring axially outwardly of a portion of said first metallic core that is fitted in said first shoulder portion, thereby sealing said portion of said first metallic core; and said second contact seal further includes an additional lip disposed in contact with said inner ring axially outwardly of a portion of said second metallic core that is fitted in said second shoulder portion, thereby sealing said portion of said second metallic core.

9. The sealed rolling bearing of claim 1 wherein grease is sealed in a space defined by said first and third contact seals and said inner and outer rings and in a space defined by said second and fourth contact seals and said inner and outer rings.

10. The sealed rolling bearing of claim 9 wherein the sliding contact surfaces with which said lips of said first and second contacts respectively seal are formed on said outer ring.

11. The sealed rolling bearing of claim 1 further comprising a retainer retaining said rolling elements, said rolling elements being disposed between raceways formed in said inner and outer rings, respectively, said raceways having their axial centers axially offset toward one axial end of the bearing from an axial center of the bearing, said retainer including an annular portion disposed on one axial side of said rolling elements remote from said one axial end of the bearing, and having no annular portion on the other axial side of said rolling elements.

12. The sealed rolling bearing of claim 11 wherein said retainer further comprises pillars extending axially from said annular portion toward said one axial end of the bearing, while being circumferentially spaced apart from each other, whereby said retainer has a crown shape, and wherein said rolling elements are balls each held between a circumferentially adjacent pair of said pillars.

* * * * *